United States Patent [19]

Hansen

[11] Patent Number: 4,539,345
[45] Date of Patent: Sep. 3, 1985

[54] MOISTURE-CURABLE POLYURETHANE COMPOSITION

[75] Inventor: Dennis D. Hansen, Luck, Wis.

[73] Assignee: Minnesota Mining and Manufacturing Company, St. Paul, Minn.

[21] Appl. No.: 697,831

[22] Filed: Feb. 4, 1985

[51] Int. Cl.$^3$ .............................................. C08L 75/00
[52] U.S. Cl. .................... 523/219; 156/329; 156/331.4; 427/387; 428/425.5; 428/425.6; 521/54; 524/114; 524/188; 524/262; 524/264; 524/265; 524/267; 524/730; 524/731; 525/452; 525/453; 525/455
[58] Field of Search .............................. 156/329, 331.4; 427/387; 428/425.5, 425.6; 521/54; 523/105, 219; 524/114, 188, 262, 264, 265, 267, 730, 731; 525/452, 453, 455

[56] References Cited

U.S. PATENT DOCUMENTS

| | | | |
|---|---|---|---|
| 3,707,521 | 12/1972 | De Santis | 524/506 |
| 3,723,163 | 3/1973 | Schumacher | 528/80 |
| 3,779,794 | 12/1973 | De Santis | 428/423.3 |
| 4,081,425 | 3/1978 | Gscheidmeier et al. | 528/205 |
| 4,124,556 | 11/1978 | Schafer et al. | 524/188 |
| 4,502,479 | 3/1985 | Garwood et al. | 128/90 |
| 4,511,626 | 4/1985 | Schumacher | 428/425.6 |

*Primary Examiner*—Maurice J. Welsh
*Attorney, Agent, or Firm*—Donald M. Sell; James A. Smith; David R. Cleveland

[57] ABSTRACT

One-part moisture-curable polyurethane adhesive, coating, sealant, or casting compositions containing a blend of isocyanate-functional prepolymer, terpene-phenolic resin, and silane compound. The compositions adhere to a variety of unprimed substrates, and resist moisture and UV exposure.

18 Claims, No Drawings

MOISTURE-CURABLE POLYURETHANE COMPOSITION

TECHNICAL FIELD

This invention relates to moisture-curable polyurethane compositions. In another aspect, this invention relates to moisture-curable polyurethane adhesives, coatings, sealers, and casting materials.

BACKGROUND ART

U.S. Pat. Nos. 3,707,521, 3,779,794, and U.S. patent application Ser. No. 416,301, filed Sept. 9, 1982, now U.S. Pat. No. 4,511,626 disclose one-part moisture-curable polyurethane compositions which can be used to bond automotive windshields and backlights to automobile bodies. These compositions typically require use of a glass primer. If the primer is omitted, insufficient bond strength typically occurs. It would be desirable to eliminate the need for a primer while retaining acceptable bond strength, as separate packaging and application of the primer represents an inconvenience and added expense.

U.S. Pat. No. 3,723,163 describes one-part moisture-curable polyurethane compositions which can be used to seal concrete. These compositions typically are used in conjunction with a primer. If the primer is omitted, then after exposure to water or humidity for a few days, the composition loses its adhesion to the concrete substrate. It would be desirable to eliminate the need for a primer while maintaining adequate bond strength. As with the aforementioned windshield sealers, separate packaging and application of the concrete sealing primer represents an expense and inconvenience.

U.S. Pat. No. 4,502,479 describes orthopedic casts prepared from a fabric web impregnated with a one-part moisture-curable polyurethane composition. Although such casts are characterized by light weight, it would be desirable to achieve a further reduction in their weight.

SUMMARY OF INVENTION

The present invention provides, in one aspect, improved one-part moisture-curable polyurethane compositions, comprising a substantially uniform mixture of isocyanate-functional prepolymer, an effective amount of terpene-phenolic resin, and an effective amount of silane compound. The compositions, when cured, have excellent adhesion to unprimed metal, glass, and concrete even when exposed to moisture, high humidity, or ultraviolet ("UV") radiation. When filled, the compositions have reduced cost without an undue loss of adhesive strength. When glass bubbles are used as a filler, the compositions have reduced density and sag.

DETAILED DESCRIPTION

In the practice of the present invention, the moisture-curable compositions can be reacted with atmospheric or added moisture to produce a polymeric polyurethane product useful, for example, as an adhesive, coating, sealant, or casting resin. The compositions of the invention contain isocyanate-functional prepolymer, terpene-phenolic resin, and silane compound.

The isocyanate-functional prepolymer (hereafter sometimes referred to as the "prepolymer") contains sufficient isocyanate groups to enable the composition to be cured or polymerized upon exposure to atmospheric or added moisture. Suitable prepolymers are described in the above-mentioned patents (the disclosures of which are incorporated herein by reference), as well as in "Urethane Polymers", *Kirk-Othmer Encyclopedia of Chemical Technology*, 3rd Edition, 23, 576–608 (1983) and in the references cited therein. Other suitable prepolymers will be familiar to those skilled in the art of manufacture of moisture-curable urethane compositions.

The prepolymers are made using conventional methods. Typically, they are prepared by reacting an excess of one or more polyisocyanates with one or more polyols to produce a substantially linear prepolymer having residual isocyanate functionality.

The terpene-phenolic resins are polymerization adducts prepared by reaction of one or more substituted or unsubstituted phenols with one or more terpenoids. The resulting adduct preferably is sufficiently free of unreacted hydroxyl groups or other active hydrogen-containing functional groups so that it will not cause premature gelation of the prepolymer when combined therewith. The likelihood of such gelation can be reduced by reacting the terpene-phenolic resin with a suitable active hydrogen-reactive species (e.g., an isocyanate or polyisocyanate) before combining the resin with the prepolymer. Preferably, the terpene-phenolic resin has a hydroxyl number less than about 200. In addition, the resin perferably is alkylated. Also, the ratio of terpene to phenol preferably is at least about 1.0:1, more preferably at least about 2.5:1, as lower ratios tend to retard the rate of cure of the compositions of the invention. A variety of terpene-phenolic resins are available, including "PICCOFYN" series "A100", "A115", "T125", and "A135" resins (commercially available from Hercules, Incorporated), "PICCOFYN" Series "M0267" and "M0293" resins (experimentally available from Hercules, Incorporated), "SP-553", "SP-559", and "SP-560" resins (commercially available from Schenectady Chemicals, Inc.), "NIREZ" Series "2019", "V-2040", "2092", and "V-2150" and "Super Beckacite" Series "2000" resins (commercially available from Reichold Chemicals, Inc.), and "Croturez" Series "AP-120" resin (commercially available from Crosby Chemicals, Inc.).

The terpene-phenolic resins typically are in the form of a yellow or brown flaked or lumpy solid. To combine them with the prepolymer it frequently is convenient to dissolve the resin in a solvent or plasticizer. Suitable solvents include toluene, xylene, acetone, ethyl acetate, "Cellosolve Acetate" (commercially available from Union Carbide Corporation), methyl ethyl ketone, and the like. Suitable plasticizers include "HB-40" partially hydrogenated terphenyl and "Santicizer 160" butyl benzyl phthalate (both commercially available from Monsanto Corp.), dioctyl phthalate, dibutyl phthalate, diisodecyl phthalate, tricresyl phosphate, and the like.

The amount of terpene-phenolic resin preferably is adjusted to provide desired handling characteristics before cure and a desired level of adhesion (measured initially and after exposure to environmental conditions such as heat, light and moisture) after cure. This amount (hereafter sometimes referred to as an "effective amount") will vary depending upon the particular prepolymer employed, the other ingredients present in the composition and the substrate and environmental conditions with which the composition will be used. In general, an effective amount of terpene-phenolic resin is an amount which will provide cohesive failure of the composition when it is applied to the desired substrate, aged under environmental conditions and subjected to adhesion testing (e.g., a peel test). Expressed numerically, a preferred amount of terpene- phenolic resin is about 0.1 to 100 parts by weight of resin per 100 parts of prepolymer, more preferably about 10 to 50 parts of resin per 100 parts of prepolymer.

The silane compound preferably is sufficiently free of active hydrogen-containing functional groups so that it will not cause premature gelation of the prepolymer when combined therewith. If present, such groups can be reacted with a suitable active hydrogen-reactive species before combining the silane compound with the prepolymer. Preferably the silane compound contains one or more alkoxy groups (e.g., methoxy or ethyoxy groups), with methoxy groups being most preferred. Suitable silane compounds include mercaptosilanes, primary and secondary aminosilanes, epoxy silanes, and acrylic silanes. Mercaptosilanes and secondary aminosilanes are preferred. An especially preferred silane compound is an adduct prepared by reacting an isocyanate-reactive silane (e.g., a mercaptosilane) and an excess (e.g., 3:1 or more based on available reactive groups) of polyisocyanate (e.g., toluene diisocyanate, hexamethylene diisocyanate, biuret of hexamethylene diisocyanate, isophorone diisocyanate, or 4,4'-diphenylmethane diisocyanate) to form an isocyanate-functional silane compound. Suitable silane compounds are also described in U.S. Pat. Nos. 3,560,543, 3,627,722, 3,707,521, 3,779,794, 3,808,018, and 3,955,036. Suitable commercially available silane compounds include "A-151" vinyltriethoxysilane, "A-153" phenyltriethoxysilane, "A-162" methyltriethoxysilane, "A-174" acrylato tris methoxy silane, "A-186" 3,4-epoxycyclohexylmethyltrimethoxysilane, "A-187" glycidoxypropyltrimethoxysilane, "A-189" gamma-mercaptopropyltrimethoxy silane, "A-1100" gamma-aminopropyltriethoxysilane, and "A-1120" N-(trimethoxysilylpropyl)ethylenediamine (all commercially available from Union Carbide Corporation), and "Z-6070" methyltrimethoxysilane, "Z-6071" phenyltrimethoxysilane, "Z-6072" dimethyldimethoxysilane, "Z-6073" methylphenyldimethoxysilane, "Z-6074" diphenyldimethoxysilane, "Z-6020" N-(trimethoxysilylpropyl)ethylenediamine, "XZ-2-2023" N-(dimethoxymethylsilylisobutyl)ethylenediamine, "Z-6030" gamma-methacryloxypropyltrimethoxysilane, "Z-6040" gamma-glycidoxypropyltrimethoxysilane, and "XZ-8-0999" gamma-chloropropyltrimethoxysilane (all commercially available from Dow Corning Corporation).

The silane compounds typically are obtained as clear liquids. They can be added to the prepolymer neat or in a suitable solvent. Suitable solvents are non-reactive organic materials such as toluene, naphtha, methyl ethyl ketone, and the like.

The amount of silane compound preferably is adjusted to provide desired handling characteristics before cure and a desired level of adhesion (measured initially and after exposure to environmental conditions) after cure. This amount (hereafter sometimes referred to as an "effective amount") will vary depending upon the particular prepolymer employed, the other ingredients present in the composition, and the substrate and environmental conditions with which the composition will be used. In general, an effective amount of silane compound is an amount which will provide cohesive failure of the composition when it is applied between two substrates, aged under environmental conditions, and subjected to an adhesion test (e.g., a peel test). Expressed numerically, a preferred amount of silane compound is about 0.1 to 25 parts by weight of silane compound per 100 parts of prepolymer, more preferably about one to 10 parts of silane compound per 100 parts of prepolymer.

The compositions of the invention can contain other adjuvents to provide desired handling and curing characteristics. Suitable adjuvants include catalysts, reinforcing fillers, extending fillers, solvents, plasticizers, drying agents, inhibitors, thixotropic agents, UV absorbers, UV stabilizers, antioxidants, tackifiers, pigments, surfactants, wetting aids and dispersants. Other cured or uncured polymers can be added to the compositions if desired. The amounts and types of adjuvants will vary depending upon the particular prepolymer employed, the other ingredients present in the composition, and the substrate and environmental conditions with which the composition will be used. Such adjuvants typically are selected and their amounts adjusted emperically based on techniques and tests well known to those skilled in the art. Suitable catalysts include organometallic compounds such as dibutyltin dilaurate, dibutytin diacetate and stannous octoate, amines such as triethylene diamine, dimethyl piperazine, bis[2-(N,N-dialkylamino)alkyl] ethers and dimorpholino dialkyl ethers, and other urethane-forming catalysts known to those skilled in the art. Suitable reinforcing or extending fillers include carbon black, metal oxides such as zinc oxide or titanium dioxide, minerals such as talc, clays, silica, and the like, and glass bubbles. Glass bubbles such as those described in U.S. Pat. No. 3,365,315 are an especially preferred filler as they enable a reduction in density and cost of the composition. Suitable solvents and plasticizers include those listed above. Toluene is a preferred solvent. Partially hydrogenated terphenyls are a preferred plasticizer. Suitable drying agents include molecular sieves such as sodium aluminum silicate and dessicants such as zeolite, silica gel, barium oxide, and calcium oxide.

The compositions of the invention can be put up in packages in accordance with techniques known to those skilled in the art. Suitable packages include, for example, caulking tubes (made, for example, of paper, metal, or plastic), screw-capped squeezable tubes, cans, drums, and the like.

The compositions of the invention are cured by exposure to water, e.g., water vapor or moisture. Ambient humidity usually is adequate to promote cure. Heat or high humidity will accelerate cure, and low temperatures (e.g., 5° C. or less) or low humidity (e.g., 15% R.H. or less) will retard cure. Bonds to damp substrates (e.g., wood) typically will cure faster than bonds to dry substrates (e.g., glass).

The compositions of the invention can be employed in any application where a high-performance adhesive, coating, sealant, or casting resin is desired. One such use includes the bonding of original or replacement glass (e.g., windshields and backlights of laminated safety glass) to vehicles such as automobiles, trucks, aircraft, trains, and the like. When so used, the compositions of the invention provide rapid drive-away times following glass installation. Other uses include building construction (e.g., as a structural adhesive, panel adhesive, moisture barrier, or glazing sealant), assembly line manufacturing (e.g., for assembly of parts such as windows by adhesive bonding), laminating (e.g., of products such as skis), coating (e.g., concrete deck coatings or roof membranes), sealing (e.g., marine sealants or sealants for use in cable splice housings), and the manufacture of moisture-curable orthopedic casts. The compositions of the invention can be applied to a variety of articles and substrates, such as articles or substrates of glass, metal, plastic, wood, leather, masonry, textiles, and the like.

The following examples are offered to aid understanding of the present invention and are not to be construed as limiting the scope thereof. Unless otherwise indicated, all parts are parts by weight.

FILLED PREPOLYMER A

An isocyanate-functional prepolymer was prepared by combining 315 parts 4,4'-diphenylmethane diisocyanate and 400 parts "LHT 28" polyol (a 6000 M.W. triol containing secondary hydroxyl groups, commercially available from Union Carbide Corporation) in a closed reaction vessel equipped with a stirrer and a nitrogen atmosphere. The resulting mixture was heated to 60° C. to melt the diisocyanate. Next, 1000 parts "Polymeg 2000" polyol (a 2000 M.W. diol having primary hydroxyl groups, commercially available from Quaker Oats Co.) was heated to 60° C. and added to the reaction vessel, followed by addition of 180 parts "HB-40" plasticizer (a partially hydrogenated terphenyl, commercially available from Monsanto Corp.). After addition of all ingredients, the reaction mixture was maintained at 60° C. for 4 hours with stirring under nitrogen. The resulting prepolymer was cooled to 40° C., stored in a sealed container under nitrogen and labelled "Prepolymer 1".

To 1500 parts Prepolymer 1 were added 150 parts "Cab-O-Sil M5" fumed silica (commercially available from Cabot Corp.), 50 parts zinc oxide, 500 parts talc, 76.5 parts titanium dioxide, 60 parts of a 95:5 acrylic acid:isooctyl acrylate solution copolymer tackifier, 200 parts "HB-40" plastizer, 155 parts toluol, 3 parts "Niax A-99" catalyst (bis[2-N,N-dimethylamino)ethyl]ether, commercially available from Union Carbide Corporation), 0.4 parts dibutyltin dilaurate, 6.1 parts brown iron oxide pigment, and 12.3 parts tan iron oxide pigment. These ingredients were stirred under nitrogen until a uniform mixture was obtained. The mixture was stored in a sealed container under nitrogen and labeled "Filled Prepolymer A".

FILLED PREPOLYMER B

To 535 parts Prepolymer 1 were added 200 parts "Regal 300R" furnace carbon black (commercially available from Cabot Corp.), 75 parts "Mesamoll" plasticizer (alkylsulphonic ester of phenol, commercially available from Mobay Chemical Corp.), and 1.5 parts "Niax A-99" catalyst. These ingredients were stirred under nitrogen until a uniform mixture was obtained. The resulting mixture was stored in a sealed container under nitrogen and labelled "Filled Prepolymer B".

FILLED PREPOLYMER C

In a reaction vessel equipped with a stirrer and a nitrogen atmosphere were combined 312 parts 4,4'-diphenylmethanediisocyanate and 400 parts "LHT 28" polyol. The resulting mixture was heated to 60° C. to melt the diisocyanate. Next, a mixture of 500 parts "Polymeg 2000" polyol and 750 parts "PPG 3025" polyol (a 3000 molecular weight diol having secondary hydroxyl groups, commercially available from Union Carbide Corporation) was heated to 60° C. and added to the reaction vessel, followed by addition of 180 parts "HB-40" plasticizer. After addition of all ingredients, the reaction mixture was maintained at 60° C. for 4 hours with stirring under nitrogen. The resulting prepolymer was cooled to 40° C., stored in a sealed container under nitrogen and labelled "Prepolymer 2".

To 750 parts Prepolymer 2 were added 75 parts "Cab-O-Sil M5" fumed silica, 25 parts zinc oxide, 250 parts talc, 40 parts "Raven 410" furnace carbon black (commercially available from Cities Service Co.), 30 parts coal tar, 100 parts "HB-40" plasticizer, 150 parts varnish maker's and painter's naphtha, 1.5 parts "Niax A-99" catalyst, and 0.19 parts dibutyltin dilaurate. These ingredients were stirred under nitrogen until a uniform mixture was obtained. The resulting mixture was stored in a sealed container under nitrogen and labeled "Filled Prepolymer C".

FILLED PREPOLYMER D

In a reaction vessel equipped with a stirrer and nitrogen atmosphere were combined 348 parts toluene diisocyanate, 1500 parts "PPG 3025" polyol, and 2000 parts "LHT 28" polyol. The resulting mixture was heated to 80° C. and maintained at that temperature for four hours, followed by cooling to 40° C. Next, 4 parts dibutyltin dilaurate were added, and the mixture stirred for 4 hours. The resulting prepolymer was stored in a sealed container under nitrogen and labeled "Prepolymer 3".

To 1000 parts of Prepolymer 3 were added 48 parts each of "Cab-O-Sil M5" fumed silica, zinc oxide, and titanium dioxide, followed by addition of 662 parts talc, 25 parts acrylic solution copolymer tackifier, 3.7 parts brown iron oxide pigment, 7.6 parts tan iron oxide pigment, and 0.24 parts dibutyltin dilaurate. These ingredients were stirred under nitrogen until a uniform mixture was obtained. The resulting mixture was stored in a sealed container under nitrogen and labeled "Filled Prepolymer D".

FILLED PREPOLYMER E

To 1015 parts Prepolymer 3 were added 500 parts talc, 120 parts "Cab-O-sil EH5" fumed silica (commercially available from Cabot Corp.), 50 parts each of titanium dioxide and zinc oxide, 138 parts varnish marker's and painter's napatha, 130 parts mineral spirits, 60 parts acrylic solution copolymer tackifier and 5 parts dibutyltin dilaurate. These ingredients were stirred under nitrogen until a uniform mixture was obtained. The resulting mixture was stored in a sealed container under nitrogen and labeled "Filled Prepolymer E".

FILLED PREPOLYMER F

A sample of "Urethane E" one-part moisture-curable polyurethane windshield sealant (commercially available from Essex Chemical Corp.) was removed from its original packaging, placed in a sealed container under nitrogen and labeled "Filled Prepolymer F".

FILLED PREPOLYMER G

A sample of "EC-5893" one-part moisture-cureable polyurethane concrete deck coating (commercially available from 3M) was labeled "Filled Prepolymer G".

FILLED PREPOLYMER H

To 535 parts Prepolymer 1 were added 200 parts "Regal 300R" furnace carbon black and a solution of 1.5 parts "Niax A-99" catalyst in 25 parts "Mesamoll" plasticizer. These ingredients were stirred under nitrogen until a uniform mixture was obtained. The resulting mixture was stored in a sealed container under nitrogen and labelled "Filled Prepolymer H".

EXAMPLE 1

A 0.5 to 0.76 mm thick spread of Filled Prepolymer A was brushed onto solvent-wiped plate glass, covered with a 25 mm wide strip of canvas, and allowed to cure at 25° C. and 50% R.H. for seven days. The cured assembly was then immersed in 25° C. tap water for seven additional days. Upon removal from the water, the canvas strip could be pulled manually from the glass using a slight hand tug, with adhesive failure occurring at the glass-adhesive interface. When evaluated using an "Instron" tensile tester operated at a crosshead separation rate of 51 mm/minute, the observed peel strength was <0.2 kg/cm of width.

A second adhesive composition was prepared as follows. In a reaction vessel equipped with a stirrer, reflux condenser and a nitrogen atmosphere were combined 1610 parts "Desmodar N-75" biuret of hexamethylene diisocyanate (commercially available from Mobay Chemical Co.), 427 parts "A-189" gamma-mercaptopropyltrimethoxy silane, and 1.3 parts dimethylpiperazine. The mixture was stirred at 80° C. for two hours and cooled to room temperature. Six parts of the resulting silane compound were mixed with 271.3 parts Filled Prepolymer A. The adhesion of the resulting composition to unprimed glass was evaluated as described above. Upon removal from the water, a moderate hand pull was required to remove the canvas strip from the glass and a cohesive failure mode was observed. The measured peel strength was 3.0 kg/cm of width.

Neither of the above two compositions contained terpene-phenolic resin. To evaluate its effect, a third adhesive composition was prepared as follows. 69.9 Parts of "Super Beckacite 2000" terpene-phenolic resin (commercially available from Reichold Chemicals, Inc.) were dissolved in 30 parts toluol, then mixed with 6 parts of the above silane compound and 271.3 parts Filled Prepolymer A. The glass adhesion of the resulting composition was evaluated as described above. Upon removal from the water, a very strong hand pull was required to remove the canvas strip from the glass, and a cohesive failure mode was observed. The measured peel strength was 4.5 kg/cm of width.

This example illustrates the improved performance of compositions of the invention. A strong, moisture-resistant bond to unprimed glass was obtained. The third composition (which contained both terpene-phenolic resin and silane compound) bonds with sufficient strength to glass that it should meet automobile manufacturing specifications without use of a glass primer. If the terpene-phenolic resin or the silane compound is excluded, then a separate glass primer application should be necessary in order to meet such specifications.

EXAMPLE 2

The third composition of Example 1 was applied to a variety of substrates, covered with a canvas strip, cured, immersed in water and evaluated as described above. For comparison purposes, the terpene-phenolic resin was excluded, or replaced with a plain terpene resin ("PICCOLYTE A-135", commercially available from Hercules, Incorporated). Set out below in Table I are the substrate and measured peel strengths for each composition.

TABLE I

| Substrate | Peel strength, kg/cm of width | | |
|---|---|---|---|
| | No resin | Terpene resin | Terpene-phenolic resin |
| Glass | 3.0 | 2.5 | 4.5 |
| Aluminum | <0.2 | 0.5 | 5.4 |
| CRS[1] | <0.2 | 0.2 | 1.8 |
| GS[2] | <0.2 | 0.2 | 4.8 |
| PS[3] | 0.4 | 0.4 | 0.7 |
| PMMA[4] | 0.4 | 0.2 | 0.5 |
| Birch | 0.5 | 0.7 | 2.1 |

[1] Cold rolled steel
[2] Galvanized steel
[3] Polystyrene, ethanol-wiped
[4] Polymethyl methacrylate, ethanol-wiped.

This example shows that inclusion of a terpene-phenolic resin enhances adhesion to a variety of substrates. Substitution of a plain terpene resin did not provide a comparable improvement.

EXAMPLE 3

75 Parts of "PICCOFYN A-135" terpene-phenolic resin were dissolved in 25 parts toluol. The resulting mixture was mixed in varying amounts with four separate mixtures each of which contained 2.2 parts of the silane compound of Example 1 and 97.8 parts Filled Prepolymer A. The resulting compositions contained 5.0, 12.6, 25.2 and 50.5 parts of terpene-phenolic resin per 100 parts of filled prepolymer, respectively. These compositions were evaluated for peel adhesion as described in Example 2. Set out below in Table II are the substrates and measured peel strengths on each substrate. For comparison purposes, values from the "No resin" column of Table I have been inserted in Table II. A hyphen in the table indicates that no data was obtained. Also shown are tensile strength and elongation values for each of the four terpene-phenolic resin-containing compositions.

TABLE II

| Substrate | Peel strength, kg/cm of width | | | | |
|---|---|---|---|---|---|
| | No resin | Terpene-phenolic resin, parts/ 100 parts of Filled Prepolymer A | | | |
| | | 5.0 | 12.6 | 25.2 | 50.5 |
| Aluminum | <0.2 | 1.1 | 1.6 | 3.2 | 1.7 |
| Galv | <0.2 | 0.5 | 0.6 | 3.2 | 3.4 |
| PS | 0.4 | 0.7 | 0.4 | 1.2 | 3.4 |
| PMMA | 0.4 | 0.3 | 0.4 | 0.9 | 2.0 |
| Pine | — | 0.7 | 0.8 | 1.4 | 2.1 |
| Oak | — | — | 1.0 | 1.4 | 1.3 |
| Tensile strength, kg/cm$^2$ | | 55.0 | 54.4 | 21.8 | 12.9 |
| Elongation, % | | 387 | 350 | 450 | 562 |

This example illustrates the use of another terpene-phenolic resin in varying amounts. Again, an improvement in adhesion was obtained on a variety of substrates.

EXAMPLE 4

In a series of four runs, one of two different silane compounds and a terpene-phenolic resin were added to Filled Prepolymer B. To adjust handling and curing characteristics, some of the runs employed additional carbon black or plasticizer. Using the method of Example 1, the resulting compositions were applied to unprimed glass, covered with canvas, cured and immersed in water. In addition, a six mm bead of each composition was applied to unprimed glass, placed glass side up in an Atlas brand "Weather-O-Meter" for seven days, then peeled from the glass to evaluate the UV resistance of each composition. Set out below in Table III are the amount of each ingredient and the observed bond failure mode for each composition.

TABLE III

| Ingredient, parts | Run no. | | | |
|---|---|---|---|---|
| | 1 | 2 | 3 | 4 |
| Filled Prepolymer B | 811.5 | 811.5 | 811.5 | 811.5 |
| Terpene-phenolic resin[1] | — | 111 | — | 125 |
| Toluol | — | 22 | — | — |
| Silane compound A[2] | — | — | 5 | — |
| Silane compound B[3] | — | — | — | 35 |
| Carbon black[4] | 50 | — | 50 | — |
| Plasticizer[5] | — | 11 | — | 25 |

| Test condition | Run no., bond failure mode, unprimed glass | | | |
|---|---|---|---|---|
| | 1 | 2 | 3 | 4 |
| 7 Day water soak | Adhesive | Adhesive | Adhesive | Cohesive |
| 7 Day U.V. exposure | Adhesive | Cohesive | Adhesive | Cohesive |

[1]"PICCOFYN A-135" terpene-phenolic resin
[2]"A-189" gamma-mercaptopropyltrimethoxy silane
[3]Silane compound of Example 1
[4]"Regal 300R" furnace carbon black. Amount shown is in addition to the amount already present in Filled Prepolymer B.
[5]"Mesamoll" plasticizer. Amount shown is in addition to the amount already present in Filled Prepolymer B.

The tack-free times for the above compositions were 5, 8, 7 and 7 minutes, respectively, for Run nos. 1–4.

This example shows that the presence of both terpene-phenolic resin and silane compound were required to obtain a composition which resisted moisture and UV exposure when applied to unprimed glass, as evidenced by the desirable cohesive failure mode of such composition in both the water soak and UV exposure tests.

EXAMPLE 5

In a series of two runs, a terpene-phenolic resin and a silane compound were added to Filled Prepolymer C. In the first run, 35 parts of the silane compound of Example 1 were added to 1451.7 parts Filled Prepolymer C. In the second run, 375 parts of "PICCOFYN A-135" terpene-phenolic resin were dissolved in 161 parts toluol and added to 35 parts of the silane compound of Example 1 and 1451.7 parts Filled Prepolymer C. Using the method of Example 1, the resulting compositions were evaluated for adhesion to a variety of substrates. Set out below in Table IV are the substrates and observed peel strengths for each run.

TABLE IV

| | Adhesion to substrate, kg/cm of width | |
|---|---|---|
| Substrate | Run 1 Silane compound only | Run 2 Silane compound plus-terpene phenolic resin |
| Glass | 1.3 | 3.6 |
| Aluminum | 0.4 | 4.5 |
| Lacquered steel | 0.4 | 1.1 |
| Enameled steel | 3.6 | 4.6 |
| CRS | 0.2 | 1.5 |
| GS | 0.4 | 2.5 |
| PS | 1.1 | 1.1 |
| PMMA | 0.4 | 1.1 |
| ABS[1] | 0.2 | 3.0 |
| Polycarbonate[2] | 0.5 | 3.6 |
| Polyvinyl chloride[2] | 0.4 | 1.1 |
| Fiberglass | — | 4.6 |
| Birch | 0.7 | 2.5 |

TABLE IV-continued

| | Adhesion to substrate, kg/cm of width | |
|---|---|---|
| Substrate | Run 1 Silane compound only | Run 2 Silane compound plus-terpene phenolic resin |
| Oak | 1.3 | 2.3 |

[1]Acrylonitrile-butadiene-styrene, ethanol-wiped
[2]ethanol-wiped

This example shows that the compositions of the invention provided a significant increase in adhesion to a variety of unprimed substrates. The results for glass, aluminum, polycarbonate, ABS and fiberglass were particularly beneficial.

EXAMPLE 6

In a series of four runs, a terpene-phenolic resin and a silane compound were added to Filled Prepolymer D. Using the method of Example 1, the resulting compositions were evaluated for adhesion to a variety of substrates. Set out below in Table V are the ingredients in each composition and the observed adhesion on each substrate.

TABLE V

| Ingredient | Run no., parts of each ingredient | | | |
|---|---|---|---|---|
| | 1 | 2 | 3 | 4 |
| Filled Prepolymer D | 1842.6 | 1842.6 | 1842.6 | 1842.6 |
| Terpene-phenolic resin[1] | — | 464.3 | — | 464.3 |
| Toluol | — | 199 | — | 199 |
| Silane compound[2] | — | — | 57.1 | 57.1 |

| Substrate | Run no., adhesion to substrate, kg/cm of width | | | |
|---|---|---|---|---|
| | 1 | 2 | 3 | 4 |
| Glass | <0.2 | 0.2 | 2.5 | 3.9 |
| Aluminum | <0.2 | 0.2 | 3.2 | 4.5 |
| CRS | <0.2 | 0.5 | 0.7 | 0.7 |
| GS | <0.2 | 0.5 | 1.4 | 4.6 |
| PS | <0.2 | 0.9 | 0.2 | 0.7 |
| PMMA | 0.4 | 1.3 | 0.2 | 0.5 |
| Birch | 0.7 | 4.8 | 1.8 | 2.1 |

[1]"PICCOFYN A135" terpene-phenolic resin
[2]Silane compound of Example 1.

This example shows that the compositions of the invention provided an especially beneficial increase in adhesion to unprimed glass, aluminum and galvanized steel.

EXAMPLE 7

In a series of three runs, a plain terpene resin, a terpene-phenolic resin, and a silane compound were added to Filled Prepolymer E. Using the method of Example 1, the resulting compositions were evaluated for adhesion to a variety of substrates. Set out below in Table VI are the ingredients in each composition and the observed adhesion on each substrate.

TABLE VI

| Ingredient | Run no., parts of each ingredient | | |
|---|---|---|---|
| | 1 | 2 | 3 |
| Filled Prepolymer E | 2068 | 2068 | 2068 |
| Terpene resin[1] | 278 | — | — |
| Terpene-phenolic resin[2] | — | 278 | 278 |
| Silane compound[3] | — | — | 55.1 |

| | Run no., adhesion to substrate, kg/cm of width |
|---|---|

TABLE VI-continued

| Substrate | 1 | 2 | 3 |
| --- | --- | --- | --- |
| Glass | 0.2 | 0.2 | 5.4 |
| Aluminum | <0.2 | 0.2 | 4.5 |
| CRS | <0.2 | 0.2 | 0.5 |
| GS | <0.2 | 0.3 | 0.8 |
| PS | 0.4 | 0.4 | 0.2 |
| PMMA | 0.2 | 0.4 | 0.5 |
| Birch | 2.9 | 3.2 | 1.3 |

[1] "PICCOLYTE C-115" terpene resin (commercially available from Hercules, Incorporated)
[2] "PICCOFYN A-135" terpene-phenolic resin
[3] Silane compound of Example 1

This example shows that the compositions of the invention provide enhanced adhesion to glass and metallic substrates, whereas compositions containing plain terpene resin and compositions lacking a silane compound do not.

EXAMPLE 8

In a series of four runs, a terpene-phenolic resin and a silane compound were added to Filled Prepolymer F. Using the method of Example 1, the resulting compositions were evaluated for adhesion to a variety of substrates. Set out below in Table VII are the ingredients in each composition and the observed adhesion on each substrate.

TABLE VII

| | Run no., parts of each ingredient | | | |
| --- | --- | --- | --- | --- |
| Ingredient | 1 | 2 | 3 | 4 |
| Filled Prepolymer F | 100 | 100 | 100 | 100 |
| Terpene-phenolic resin[1] | — | 25.2 | — | 25.2 |
| Toluol | — | 10.8 | — | 10.8 |
| Silane compound[2] | — | — | 2.35 | 2.35 |

| | Run no., adhesion to substrate, kg/cm of width | | | |
| --- | --- | --- | --- | --- |
| Substrate | 1 | 2 | 3 | 4 |
| Glass | <0.2 | <0.2 | 3.2 | 1.8 |
| Aluminum | <0.2 | 1.4 | 3.0 | 2.1 |
| CRS | <0.2 | 0.7 | <0.2 | 2.9 |
| GS | <0.2 | <0.2 | 0.5 | 1.8 |
| PS | 1.6 | 1.8 | <0.2 | 0.9 |
| PMMA | 0.4 | 3.6 | <0.2 | 1.8 |
| Birch | 0.7 | 3.6 | 0.7 | 1.1 |

[1] "PICCOFYN A-135" terpene-phenolic resin
[2] Silane compound of Example 1.

This example shows that the Run no. 1 composition (a commercial sealant) could be improved in adhesion to all substrates. The composition of the invention (Run no. 4) provided the best improvement on steel substrates. On glass, the peel adhesion of the composition of Run no. 3 exceeded the value obtained with the composition of the invention. However, after UV exposure, evaluation of adhesion would demonstrate that the composition of the invention has better adhesion to glass than the compositions of Run nos. 1–3, as it fails cohesively rather than adhesively after UV exposure.

EXAMPLE 9

In a series of four runs, a terpene-phenolic resin and a silane compound were added to Filled Prepolymer G. The resulting compositions were applied as a 3 mm thick film to clean, unprimed concrete slabs, covered with a canvas strip, and allowed to cure at 25° C. and 50% R.H. for three days. The coated concrete samples were then immersed in 25° C. tap water and tested at various times to determine the degree of adhesion of the coating to the concrete. A qualitative test of adhesion was performed on each sample after removing it from the water. The force required to remove the coating by hand and the bond failure mode were noted. Once a composition failed adhesively, further testing was discontinued.

TABLE VII

| | Run no., parts of each ingredient | | | |
| --- | --- | --- | --- | --- |
| Ingredient | 1 | 2 | 3 | 4 |
| Filled Prepolymer G | 100 | 100 | 100 | 100 |
| Terpene-phenolic resin[1] | — | 25 | — | 25 |
| Toluene | — | 11 | — | 11 |
| Silane compound[2] | — | — | 3.1 | 3.1 |

| Immersion Time | Run no., adhesion force[3]/Failure mode | | | |
| --- | --- | --- | --- | --- |
| | 1 | 2 | 3 | 4 |
| 1 day | weak/adhesive | weak/adhesive | mod/cohesive | strong/cohesive |
| 1 week | — | — | mod/adhesive | strong/cohesive |
| 1 month | — | — | — | strong/cohesive |
| 6 months | — | — | — | strong/cohesive |

[1] "PICCOFYN A-135" terpene-phenolic resin
[2] Silane compound of Example 1
[3] weak = removed easily
mod = removed with a slight tug
strong = removed only with a sustained pull This example shows that the Run No. 1 composition (a commercial deck coating) could be improved in adhesion to unprimed concrete.

EXAMPLE 10

In a series of two runs, a terpene-phenolic resin, a silane compound, and glass bubbles were added to Filled Prepolymer H. In the first run, 112 parts "PICCOFYN A-135" terpene-phenolic resin, 66 parts "Mesamoll" plasticizer and 22 parts toluene were mixed together and then mixed with 761.5 parts Filled Prepolymer H, 10 parts "Cab-O-Sil M5" fumed silica, and 35 parts of the silane compound of Example 1. The resulting composition had flow characteristics which were well suited for use in hand-operated caulking gun equipment. In the second run, the fumed silica was replaced with 75 parts "C15/250" glass bubbles (commercially available from 3M). The resulting composition had flow characteristics which were well suited for use in pneumatically-operated application equipment.

Various modifications and alterations of this invention will be apparent to those skilled in the art without departing from the scope and spirit of this invention and the latter should not be restricted to that set forth herein for illustrative purposes.

I claim:

1. A one-part moisture-curable polyurethane composition, comprising a substantially uniform mixture of isocyanate-functional prepolymer, and effective amount of terpene-phenolic resin, and an effective amount of silane compound.

2. A composition according to claim 1, wherein said terpene-phenolic resin has a hydroxyl number less than about 200.

3. A composition according to claim 1, wherein said terpene-phenolic resin has a ratio of terpene to phenol of at least about 1.0:1.

4. A composition according to claim 1, containing about 0.1 to 100 parts by weight of said resin per 100 parts of said prepolymer.

5. A composition according to claim 4, containing about 10 to 50 parts by weight of said resin per 100 parts of said prepolymer.

6. A composition according to claim 1, wherein said silane compound comprises mercaptosilane or secondary aminosilane.

7. A composition according to claim 1, wherein said silane compound contains one or more alkoxy groups.

8. A composition according to claim 1, wherein said silane compound comprises an isocyanate-functional adduct of isocyanate-reactive silane and polyisocyanate.

9. A composition according to claim 1, containing about 0.1 to 25 parts by weight of said silane compound per parts of said prepolymer.

10. A composition according to claim 9, containing about 1 to 10 parts by weight of said silane compound per 100 parts of said prepolymer.

11. A composition according to claim 1, further comprising bis[2-N,N-dialkylamino)alkyl] ether or dimorpholinodialkyl ether catalyst.

12. A composition according to claim 1, further comprising glass bubbles.

13. An article of manufacture, comprising a first and a second substrate, with a layer therebetween comprising a one-part moisture-cured polyurethane composition derived from a substantially uniform blend of isocyanate-functional prepolymer, terpene-phenolic resin, and silane compound.

14. An article according to claim 13, wherein said first substrate comprises a vehicle and said second substrate comprises laminated safety glass.

15. An article of manufacture, comprising a substrate coated with a layer of a one-part moisture-cured polyurethane composition derived from a substantially uniform blend of isocyanate-functional prepolymer, terpene-phenolic resin, and silane compound.

16. An article according to claim 15, wherein said substrate comprises cured concrete.

17. An article according to claim 15, wherein said substrate comprises a fabric web and said article comprises an orthopedic cast.

18. A method for coating a first substrate, or for bonding a second substrate thereto, comprising the steps of applying to said first substrate a layer of one-part moisture-curable polyurethane comprising a substantially uniform blend of isocyanate-functional prepolymer, an effective amount of terpene-phenolic resin, and an effective amount of silane compound, optionally applying said second substrate to said layer, and allowing said composition to cure.

* * * * *

UNITED STATES PATENT AND TRADEMARK OFFICE
CERTIFICATE OF CORRECTION

PATENT NO. : 4,539,345

DATED : September 3, 1985

INVENTOR(S) : Dennis D. Hansen

It is certified that error appears in the above-identified patent and that said Letters Patent is hereby corrected as shown below:

Column 12, line 57, "and" should read -- an --.

Signed and Sealed this

Third Day of June 1986

[SEAL]

Attest:

DONALD J. QUIGG

Attesting Officer

Commissioner of Patents and Trademarks